(12) United States Patent
Lee et al.

(10) Patent No.: US 10,322,361 B2
(45) Date of Patent: Jun. 18, 2019

(54) WATER PURIFYING SYSTEM AND BACKWASH MODULE CONTROL METHOD THEREOF

(71) Applicant: DOOSAN HEAVY INDUSTRIES & CONSTRUCTION CO., LTD., Changwon-si, Gyeongsangnam-do (KR)

(72) Inventors: Woo Nyoung Lee, Seoul (KR); Sung Won Park, Goyang-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 199 days.

(21) Appl. No.: 15/298,835

(22) Filed: Oct. 20, 2016

(65) Prior Publication Data

US 2017/0113167 A1    Apr. 27, 2017

(30) Foreign Application Priority Data

Oct. 21, 2015    (KR) .................. 10-2015-0146906

(51) Int. Cl.
*B01D 29/66* (2006.01)
*B01D 61/10* (2006.01)
(Continued)

(52) U.S. Cl.
CPC ....... *B01D 29/663* (2013.01); *B01D 35/1573* (2013.01); *B01D 61/025* (2013.01);
(Continued)

(58) Field of Classification Search
CPC ........ B01D 2201/16; B01D 2311/2649; B01D 2313/46; B01D 2313/48; B01D 2313/50;
(Continued)

(56) References Cited

U.S. PATENT DOCUMENTS 4,086,166 A * 4/1978 Martin ................. B01D 37/04
                                                      210/257.2
5,234,605 A   8/1993 Reipur et al.
(Continued)

FOREIGN PATENT DOCUMENTS

FR    2716385 A1 * 8/1995 ........... B01D 29/117
JP    3014512 U       8/1995
WO    2010121628 A1   10/2010

OTHER PUBLICATIONS

English Translation of FR 2716385 A1; Aug. 1995 (Year: 1995).*
(Continued)

*Primary Examiner* — Terry K Cecil
(74) *Attorney, Agent, or Firm* — Invenstone Patent, LLC (57) ABSTRACT

Disclosed herein is a water purifying system, including: a raw water tank configured to store raw water; a filter unit configured to include a plurality of filtration modules for purifying the raw water and a plurality of valves for feeding or cutting off the raw water; a raw water pump configured to feed the raw water from the raw water tank to the filter unit; and a backwash module configured to feed backwash water to the filter unit, in which some of permeate water permeated by the filter unit is fed to the backwash module to be used as the backwash water and a feed pressure of the backwash water is fed by the raw water pump.

20 Claims, 7 Drawing Sheets

(51) Int. Cl.
　　　　*B01D 61/02*　　　(2006.01)
　　　　*C02F 1/44*　　　　(2006.01)
　　　　*B01D 61/22*　　　(2006.01)
　　　　*B01D 65/02*　　　(2006.01)
　　　　*B01D 35/157*　　 (2006.01)
　　　　*C02F 1/00*　　　　(2006.01)
　　　　*B01D 61/14*　　　(2006.01)

(52) U.S. Cl.
　　　 CPC ........... *B01D 61/10* (2013.01); *B01D 61/145* (2013.01); *B01D 61/147* (2013.01); *B01D 61/22* (2013.01); *B01D 65/02* (2013.01); *C02F 1/001* (2013.01); *C02F 1/441* (2013.01); *C02F 1/444* (2013.01); *B01D 2201/16* (2013.01); *B01D 2311/2649* (2013.01); *B01D 2313/46* (2013.01); *B01D 2313/48* (2013.01); *B01D 2313/50* (2013.01); *B01D 2317/04* (2013.01); *B01D 2321/04* (2013.01); *B01D 2321/12* (2013.01); *C02F 2201/005* (2013.01); *C02F 2201/009* (2013.01); *C02F 2209/40* (2013.01); *C02F 2303/16* (2013.01); *Y02A 20/212* (2018.01)

(58) Field of Classification Search
　　　 CPC ............ B01D 2317/04; B01D 2321/04; B01D 2321/12; B01D 29/633; B01D 35/1573; B01D 61/025; B01D 61/10; B01D 61/145; B01D 61/147; B01D 61/22; B01D 65/02; C02F 1/001; C02F 1/441; C02F 1/444; C02F 2201/005; C02F 2201/009; C02F 2209/40; C02F 2303/16; Y02A 20/212

See application file for complete search history.

(56) References Cited

U.S. PATENT DOCUMENTS

| 5,354,466 | A | 10/1994 | Yunoki | |
| 2014/0131281 | A1* | 5/2014 | Morikawa | B01D 61/025 210/641 |
| 2016/0280568 | A1* | 9/2016 | Wilson | C02F 1/008 |
| 2017/0106339 | A1* | 4/2017 | Smirnov | B01D 61/025 |

OTHER PUBLICATIONS

Communication dated Feb. 21, 2017, from the European Patent Office in counterpart European Application No. 16195069.6.
Communication dated Oct. 20, 2016 from the Korean Intellectual Property Office in counterpart application No. 10-2015-0146906.
Communication dated Apr. 18, 2017 from the Korean Intellectual Property Office in counterpart application No. 10-2015-0146906.

* cited by examiner

WATER PURIFYING SYSTEM AND BACKWASH MODULE CONTROL METHOD THEREOF

CROSS-REFERENCE TO RELATED APPLICATION

This application claims priority to Korean Patent Application No. 10-2015-0146906, filed on Oct. 21, 2015, the disclosure of which is incorporated herein by reference in its entirety.

BACKGROUND OF THE INVENTION

Field of the Invention

Exemplary embodiments of the present invention relate to a water purifying system and a backwash module control method thereof, and more particularly, to a water purifying system and a backwash module control thereof capable of performing backwash of a filter module using a pressure of a pressure of produced water for membrane filtration without a backwash pump.

Description of the Related Art

Recently, underground water, rivers, or the like are seriously contaminated due to heavy metal, pathogenic microorganism, micro organic toxic materials, or the like, and therefore safety guarantee of drinking water has been considered very important. Accordingly, an interest in researches for a water purifying apparatus and a water purifying method of drinking water to guarantee safe drinking water has been increased. As a typical water purifying method, there are a chlorination method, an ozone treatment method, a membrane filtration method, etc. Here, a water purifying system for changing some of the treatment methods or operating at least two treatment methods by step has been mainly used.

However, the existing chlorination method has a problem in that trihalomethane is generated as a byproduct at the time of chlorine disinfection and the existing ozone treatment method has a problem in that ozone selectively treats organic toxic materials.

The water purifying method using the membrane filtration is a method for filtering and removing pollutants included in raw water using a membrane as described in Korean Patent Laid-Open Publication No. 2003-0079479 and has an advantage of reducing a scale of water purifying apparatus. However, there is a disadvantage in that a closure of the filtration membrane due to pollutants causes a frequent replacement of the filtration membrane to incur excessive operation costs.

To solve the disadvantage of the water purifying method using the membrane filtration method, a separate backwash water storage tank and pump and a backwash system for backwash of the filtration membrane need to be constructed.

However, there is a problem in that the existing backwash system costs a lot upon construction and incurs additional operation costs due to the operation of the pump.

RELATED ART DOCUMENT

Patent Document (Patent Document 1) Korean Patent Laid Open Publication No. 2003-0079479 (Published on Oct. 10, 2003)

SUMMARY OF THE INVENTION

An object of the present invention is to provide a water purifying system and a backwash module control method thereof capable of performing backwash of a filter module using a pressure of produced water for membrane filtration without a backwash pump.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided a water purifying system, including: a raw water tank configured to store raw water; a filter unit configured to include a plurality of filtration modules for purifying the raw water and a plurality of valves for feeding or cutting off the raw water; a raw water pump configured to feed the raw water from the raw water tank to the filter unit; and a backwash module configured to feed backwash water to the filter unit, in which some of permeate water permeated by the filter unit is fed to the backwash module to be used as the backwash water and a feed pressure of the backwash water is fed by the raw water pump.

The backwash module may be provided with two inlets and outlets.

The one inlet may be provided with a first valve for controlling a flux of the raw water, the other inlet may be provided with a fourth valve for feeding the permeate water, the one outlet may be provided with a second valve for discharging the raw water, and the other outlet may be provided with a third valve for discharging the backwash water.

The backwash module may be a pressure vessel or a pressure tank.

An inside of the pressure vessel may be provided with a piston moving along a length direction, the piston may move to the first valve when the permeate water is fed to discharge the raw water to an outside of the pressure vessel and move to the third valve when the raw water is fed to discharge the backwash water to the outside of the pressure vessel.

An inside of the pressure tank may be provided with a diaphragm, the diaphragm may move to the first valve when the permeate water is fed to discharge the raw water to the outside of the pressure vessel and move to the third valve when the raw water is fed to discharge the backwash water to the outside of the pressure vessel.

The pressure tank may be installed at a movement limit position of the diaphragm and may further include a pair of plates provided with a plurality of through holes.

The inside of the pressure tank may include a balloon-like diaphragm, the diaphragm may be pressurized when the raw water is fed to discharge the backwash water therein to the outside of the pressure tank and inflated when the permeate water is fed to discharge the raw water at the outside thereof to the outside of the pressure tank.

The water purifying system may further include: a dirty water tank configured to discharge the backwash water after the backwash of the filtration module.

An amount of permeate water of the filtration module may be increased as a required amount of the backwash water.

When the permeate water permeated by the filtration module is fed to a reverse osmosis system, the flux of the raw water may be increased as the required amount of the backwash water.

The water purifying system may further include: a flow meter configured to be installed at a front end of the first valve to detect the flux of the raw water.

The first valve may be a flow control valve and the second to fourth valves may be an on/off valve.

When the backwash module is fed with the permeate water, the first and third valves may be closed and the second and fourth valves may be open, when the backwash is performed, the first and third valves may be open and the second and fourth valves may be closed.

The first valve may control the flux of the raw water depending on a preset backwash flux.

In accordance with another aspect of the present invention, there is provided a backwash module control method of the water purifying system having the configuration, in which the first to fourth valves are controlled depending on the re-feed of the permeate water to the backwash module upon the backwash when the permeate water is fed to the backwash module.

When the permeate water is fed and re-fed to the backwash module, the first and third valves may be closed and the second and fourth valves may be open.

When the backwash is performed, the first and third valves may be open and the second and fourth valves may be closed.

The first valve may control the flux of the raw water depending on the detection result of the flow meter detecting the flux of the raw water.

The first valve may control the flux of the raw water depending on a preset backwash flux.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, a water purifying system and a backwash module control method thereof according to an embodiment of the present invention will be described in detail with reference to the accompanying drawings.

Figure 1:
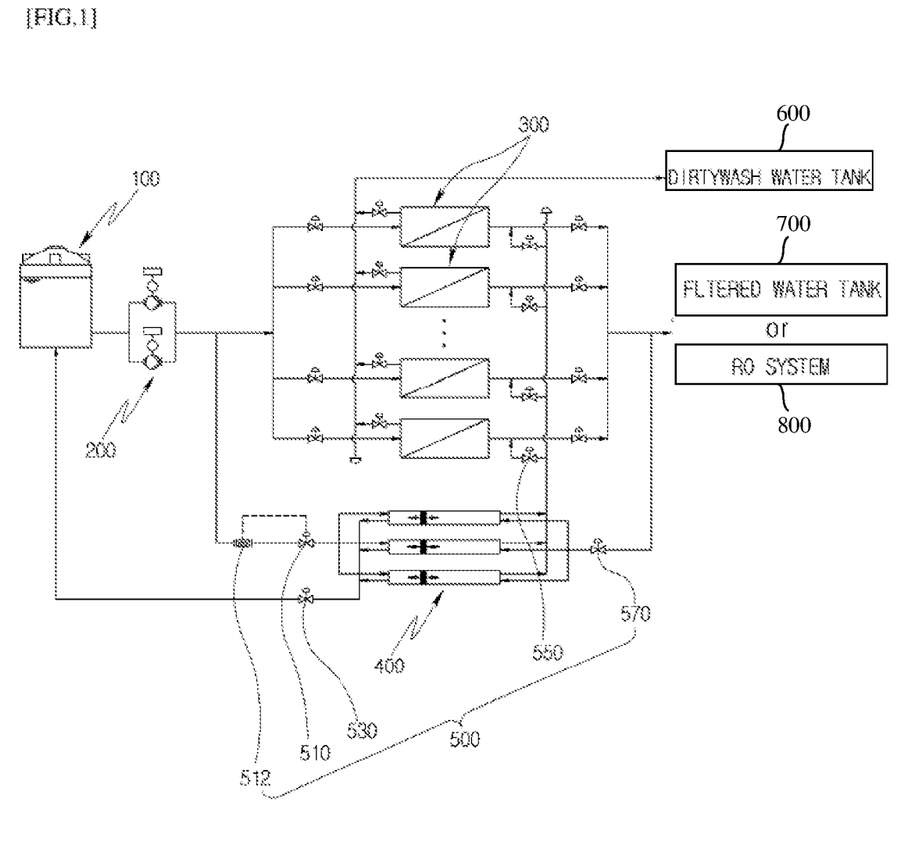
FIG. 1 is a diagram schematically illustrating a water purifying system according to an embodiment of the present invention.

FIG. 1 is a diagram schematically illustrating a water purifying system according to an embodiment of the present invention.

As illustrated in FIG. 1, the water purifying system according to the embodiment of the present invention is a system based on a filtration membrane method and includes a raw water tank 100 configured to feed raw water, a raw water pump 200 configured to feed the raw water, a filter unit configured to purify the raw water, and a backwash module 400 configured to wash a filter unit. The water purifying system includes a plurality of control valves or an on/off valve to open and close a channel for feeding and cutting off the raw water, feeding and cutting off backwash water, discharging permeate water permeated by a filter unit, or the like. In particular, the backwash module 400 is provided with two inlets and outlets, in which each inlet and outlet are provided with first to fourth valves 500.

The respective components of the present invention are connected to each other by a transfer tube through which any one of the raw water, the backwash water, and the permeate water is transferred. Unless separately mentioned, it will to be understood that water circulating within the water purifying system of the present invention is transferred along the transfer tube.

The raw water tank 100 is used to temporarily store the raw water, in which the raw water is transferred to the filter unit by the raw water pump 200.

The filter unit is configured to include a plurality of filtration modules 300 and a plurality of valves (these are illustrated in the drawings but have no reference numeral) for feeding and discharging the raw water and the backwash water, in which the filtration module 300 may be implemented as a microfiltration (MF) module, an ultrafiltration (UF) module, etc.

The microfiltration membrane is one of the polymeric separator membranes and has a micro pore of about 0.01 to 10 micros and stops suspensoid, colloidal particles, bacteria, or the like. The ultrafiltration membrane passes though water but does not pass through polymer material or colloidal materials.

One filtration module 300 is configured by modularizing 10 to 100 filtration membranes depending on raw water processing capacity. If an operating time of the filtration module 300 is long, foreign materials are attached to a surface of the filtration membrane, and therefore filtration efficiency is reduced. As a result, it is essential to wash the filtration module 300. As the typical method for washing a filtration membrane, a method for separating pollutants attached to a separator membrane by feeding washing water in a direction opposite to a direction in which the raw water is fed, without separately separating and washing the filtration membrane is used. The method is defined as backwash.

The permeate water purified by the filtration module 300 may be transferred to a separate permeate water storage tank 700 and stored therein or may be fed to a reverse osmosis system 800 to be re-permeated.

The backwash module 400 may be provided as a pressure vessel or a pressure tank. Some of the raw water fed by the raw water pump 200 is fed to the backwash module 400. For this purpose, a separate transfer tube is connected to a back end of the raw water pump 200.

The backwash water for backwash uses some of the permeate water permeated by the filtration module 300 and some of the permeate water is fed to the pressure vessel or the pressure tank of the backwash module 400. For this purpose, the separate transfer tube is branched from the permeate water outlet and thus is connected to the backwash module 400.

As the backwash water, the permeate water in the pressure vessel or the pressure tank is fed to the filtration module 300 by the pressure applied into the pressure vessel or the pressure tank. The water used for backwash the filtration membrane of the filtration module 300 is discharged to a separate dirtywash water tank. If the backwash is completed, the raw water within the backwash module is discharged and the backwash module is again filled with some of the permeate water (refer to FIG. 2).

The operating principle of the backwash module 400 will be described below in more detail.

The backwash module 400 is provided with two inlets and outlets, in which one inlet is introduced with the raw water and the other inlet is introduced with the permeate water, and the backwash module 400 is further provided with a plurality of valves 500. Further, the raw water is discharged to one outlet and the permeate water for backwash is discharged to the other outlet. The inlet into which the raw water is introduced is provided with a first valve 510 and a flow meter 512 and the outlet to which the raw water is discharged is provided with a second valve 530. Further, the outlet to which the permeate water is discharged is provided with a third valve 550 and the inlet into which the permeate water is introduced is provided with a fourth valve 570. The first valve 510 may be provided as a flow control valve and the second to fourth valves 530, 550, and 570 may be provided as the on/off valve.

When some of the permeate water purified by passing through the filtration module 300 is introduced into the pressure vessel or the pressure tank of the backwash module 400, the first valve 510 and the third valve 550 is closed and the second valve 530 and the fourth valve 570 are open. Therefore, the inside of the pressure vessel or the pressure tank is filled with the permeate water.

Upon the backwash, the second valve 530 and the fourth valve 570 are closed and the first valve 510 and the third valve 550 are open, and thus the permeate water in the pressure vessel or the pressure tank is discharged through the third valve 550 by the introduction pressure of the raw water.

Generally, the operating pressure of the filtration module 300 is equal to or more than 3 bars but the backwash pressure is enough to be equal to or less than 3 bars. Therefore, even though a separate pump for feeding the backwash water is not provided, the backwash water may be fed to the filtration module 300 only by the feed pressure of the raw water.

Hereinafter, various forms of the backwash module 400 will be described.

Figure 2:
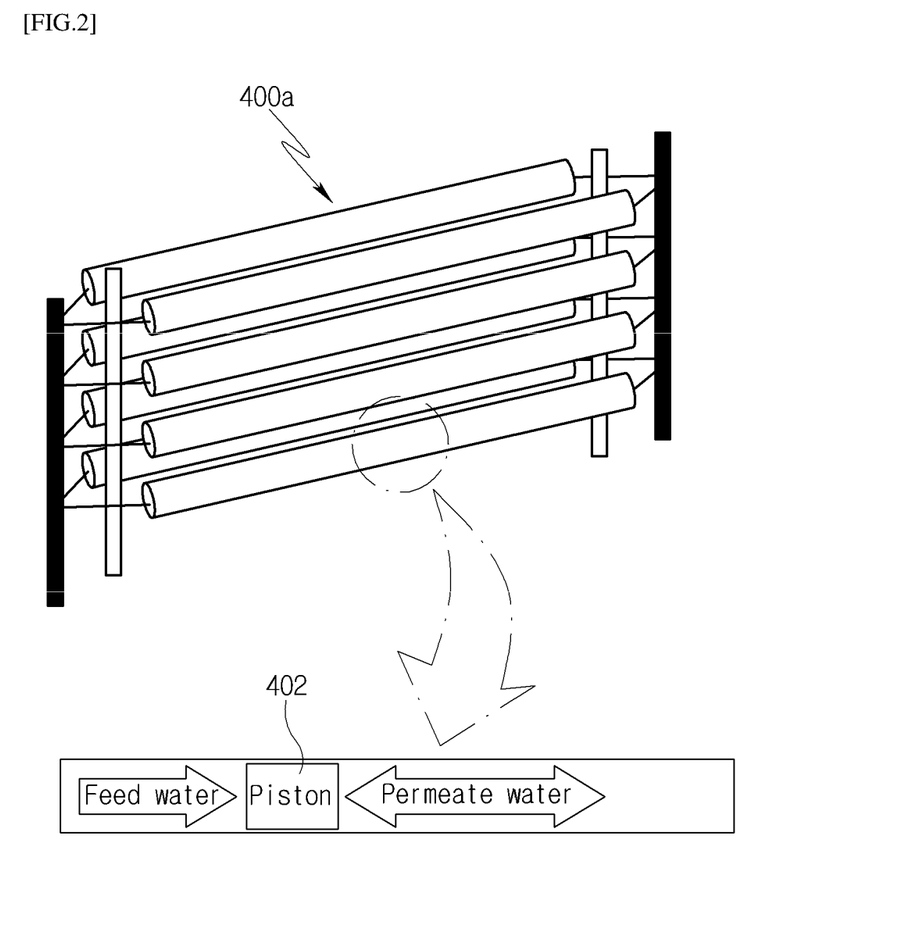
FIG. 2 is a schematic diagram of a first embodiment of a backwash module according to the water purifying system of FIG. 1.
Figure 3:
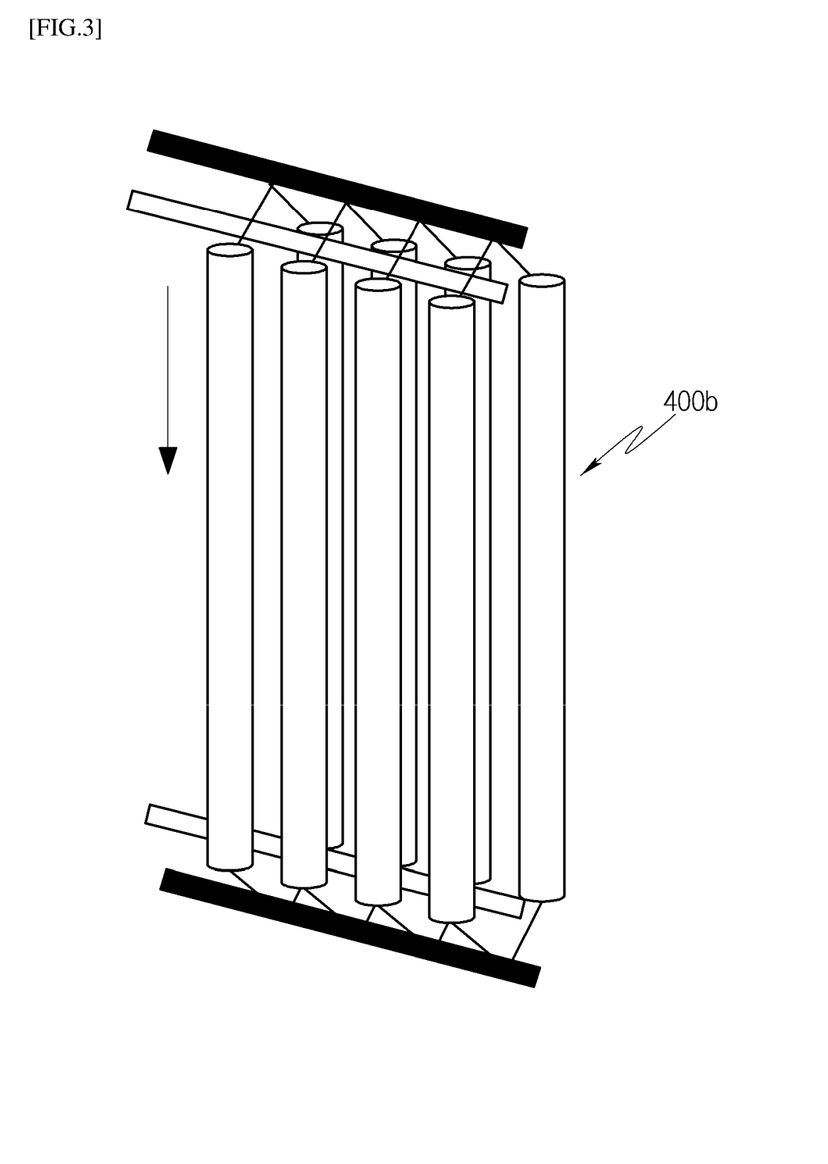
FIG. 3 is a schematic diagram of a second embodiment of the backwash module according to the water purifying system of FIG. 1.

FIG. 2 is a schematic diagram of a first embodiment of a backwash module according to the water purifying system of FIG. 1 and FIG. 3 is a schematic diagram of a second embodiment of the backwash module according to the water purifying system of FIG. 1.

As illustrated in FIGS. 2 and 3, backwash modules 400a and 400b may be a tube type pressure vessel.

The backwash module 400a may be a horizontal type to an installation surface as illustrated in FIG. 2 but the pressure vessel 400b may be a vertical type to the installation surface as illustrated in FIG. 3.

The inside of the pressure vessel of FIG. 3 may be provided with a piston 402 and the feed direction of the raw water and the discharge direction of the backwash water may be disposed on a straight line.

The pressure vessel of FIG. 3 is not illustrated in the drawing, but like the horizontal type, the inside of the pressure vessel is provided with the piston. In this case, the discharge direction of the backwash water corresponds to an arrow direction.

Figure 4:
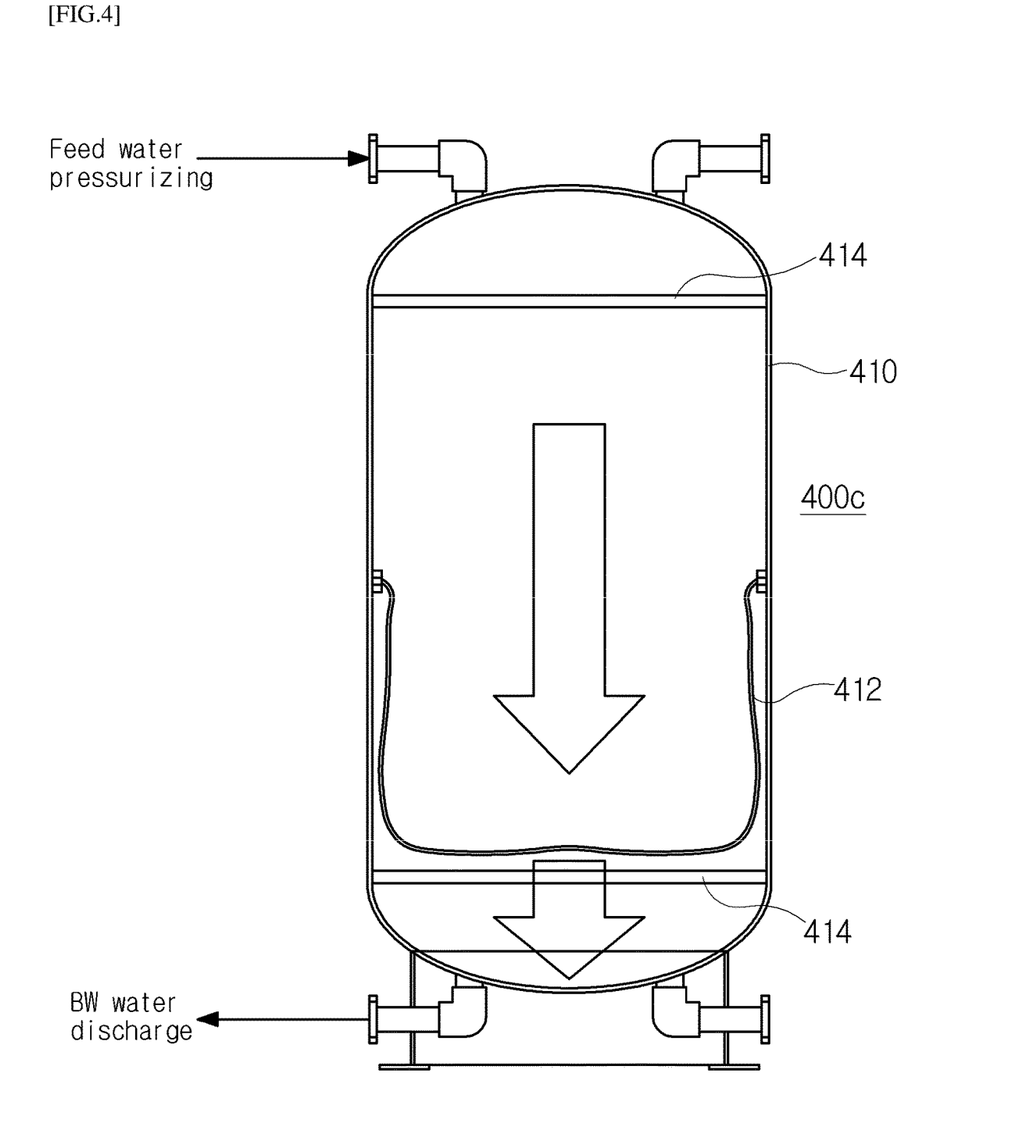
FIGS. 4 and 5 are schematic diagrams of a third embodiment of the backwash module according to the water purifying system of FIG. 1.
Figure 5:
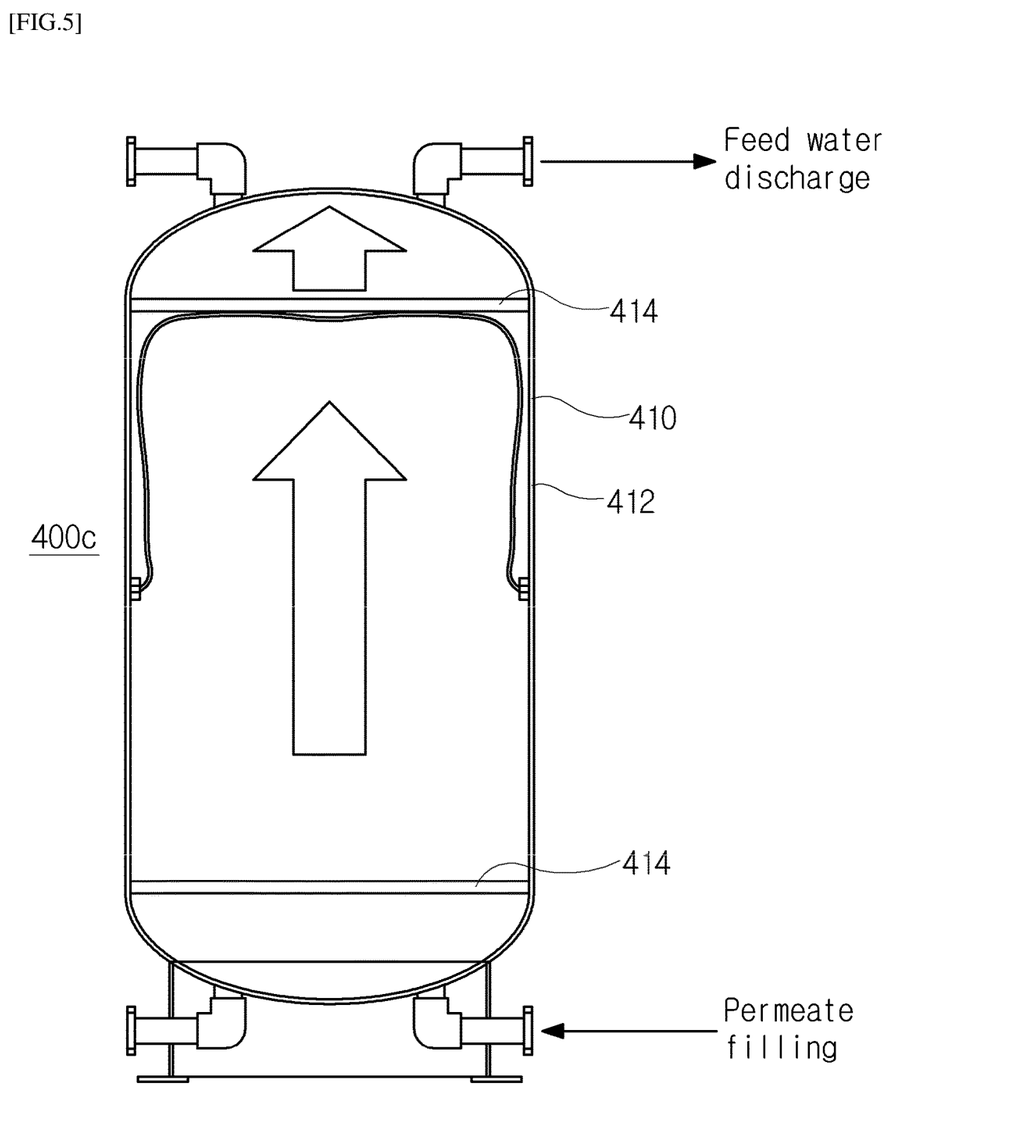

FIGS. 4 and 5 are schematic diagrams of a fourth embodiment of the backwash module according to the water purifying system of FIG. 1.

As illustrated in FIGS. 4 and 5, a backwash module 400c according to the present invention may be configured to include the pressure tank 410 and a diaphragm 412 installed in the pressure tank 410.

As illustrated in FIG. 4, the diaphragm 412 moves a lower portion of the pressure tank 410 by the feed pressure of the raw water fed from an upper portion of the pressure tank 410 and discharges the previously filled backwash water to the lower portion of the pressure tank 410. As illustrated in FIG. 5, the pressure of the permeate water after the backwash introduced into the lower portion of the pressure tank 410 moves the diaphragm 412 to the upper portion of the pressure tank 410 discharges the raw water filled in the pressure tank 410 to the upper portion of the pressure tank 410.

The upper and lower portions of the pressure tank 410 are provided with a pair of plates 414 which is formed corresponding to a movement limit position of the diaphragm 412. Further, the plate 414 is provided with a plurality of through holes and therefore does not hinder the movement of the raw water or the backwash water.

Figure 6:
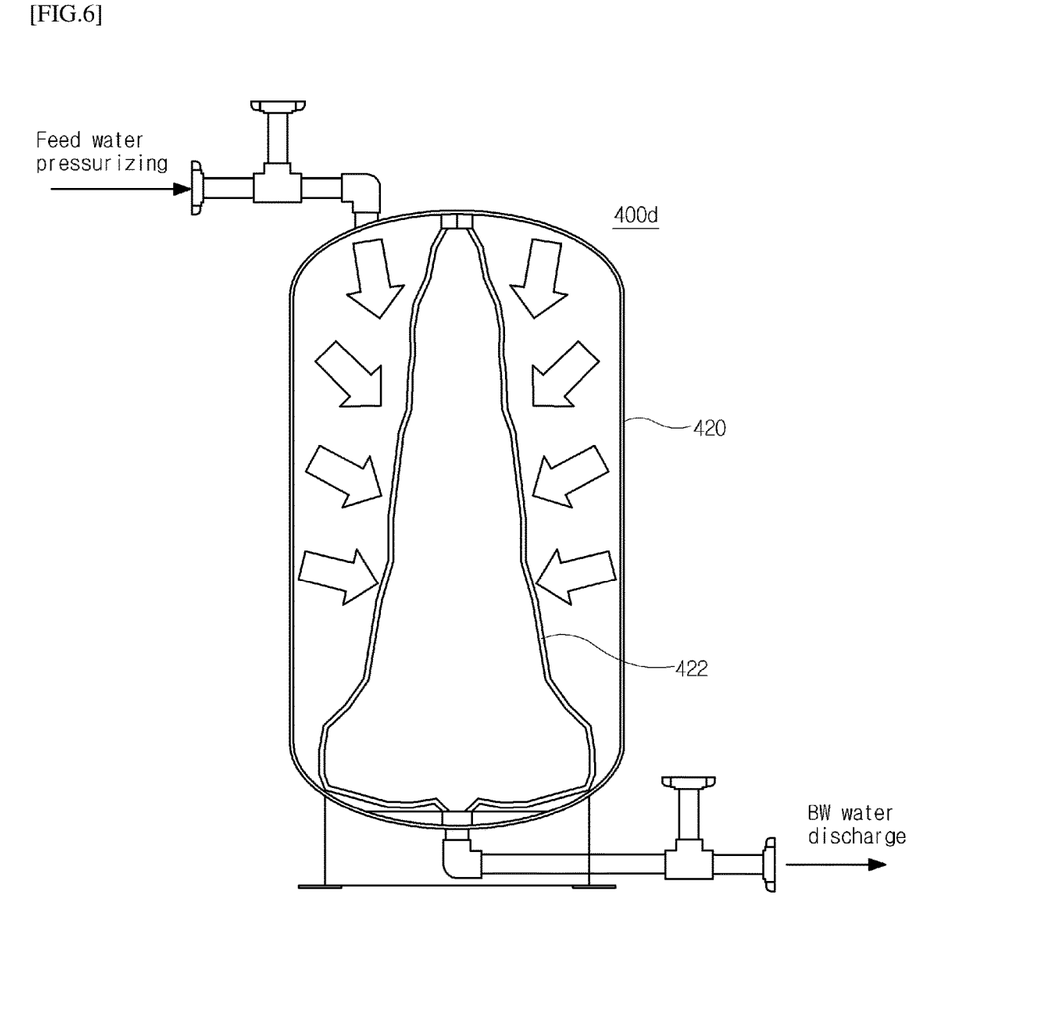
FIGS. 6 and 7 are schematic diagrams of a fourth embodiment of the backwash module according to the water purifying system of FIG. 1.
Figure 7:
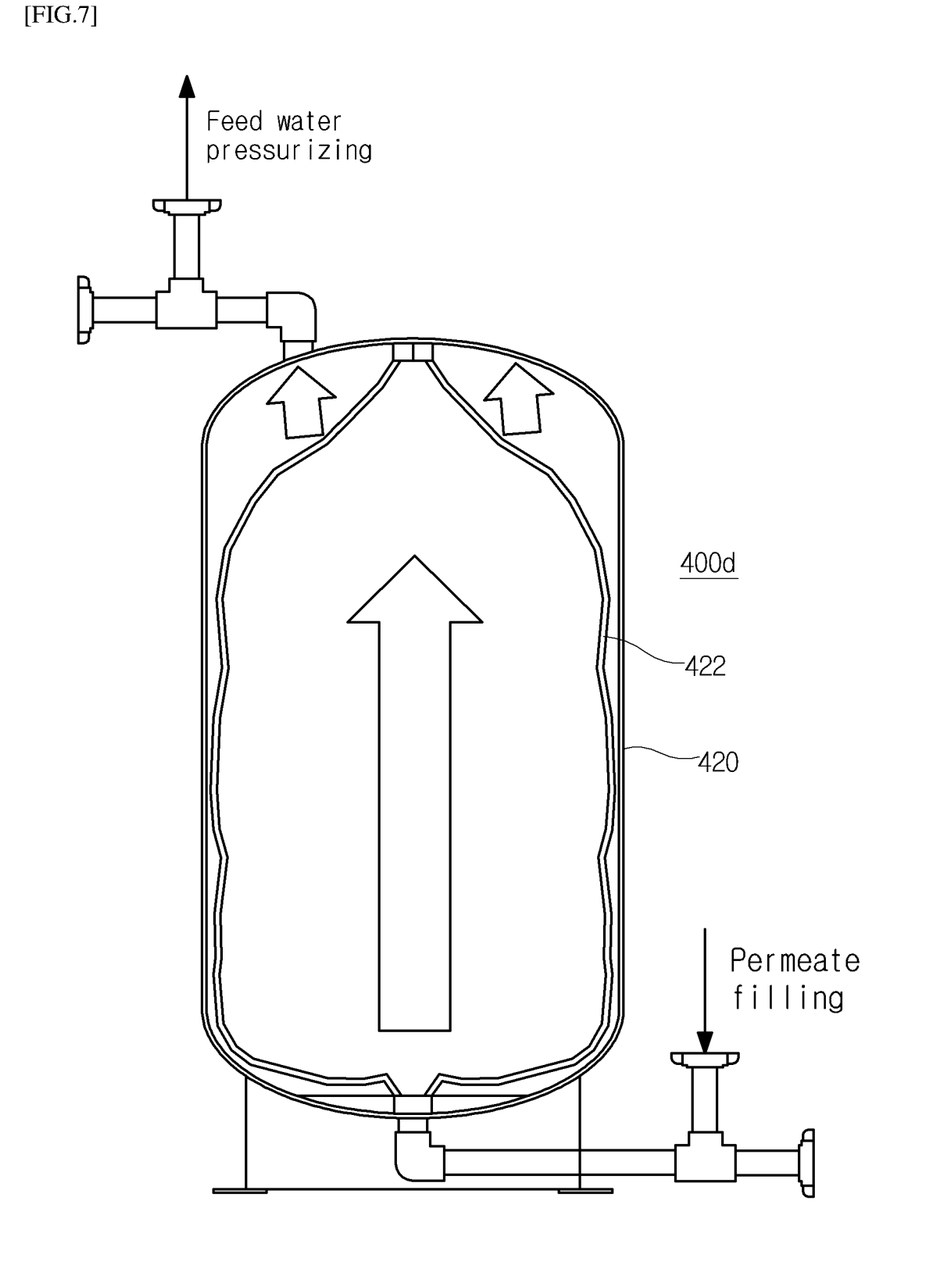

FIGS. 6 and 7 are schematic diagrams of a fourth embodiment of the backwash module according to the water purifying system of FIG. 1.

As illustrated in FIGS. 6 and 7, a backwash module 400d according to the present invention may be configured to include the pressure tank 420 and a balloon-like diaphragm 422 installed in the pressure tank 420.

As illustrated in FIG. 6, the pressure of the raw water applied from the upper portion of the pressure tank 420 presses the diaphragm 422 from the outside and the backwash water in the diaphragm 422 is discharged to the lower portion of the pressure tank 420 while the diaphragm 422 is pressurized by the pressure of the raw water. As illustrated in FIG. 7, the diaphragm 422 is inflated by the pressure of the permeate water after the backwash that is introduced from the lower portion of the pressure tank 420 into the diaphragm 422 to push the raw water filled in the outside of the diaphragm 422 to the upper portion of the pressure tank 420, thereby discharging the raw water.

As such, if some of the permeate water permeated by the filtration module 300 is used as the backwash water, it is preferable to design and operation a system to produce more permeate water as much as the amount of permeate water required for the backwash.

When the permeate water is not stored in the permeate water storage tank 700 and is directly connected to a feed water tube of the reverse osmosis system 800, the feed water fed to the reverse osmosis system 800 is reduced as much as the amount of backwash water used for the backwash. To solve the problem, the reduction in flux of the feed water to the reverse osmosis system 800 may be supplemented by increasing the processing capacity of the raw water pump 200 and increasing the flux of the raw water.

A flow of fluid by processed state in the water purifying system according to the present invention having the foregoing configuration will be described below (refer to FIG. 1).

First, if the raw water is fed from the raw water 100 to the raw water pump 200, the raw water is fed to each of the filtration modules 300 through the plurality of valves. In this case, the flow direction of the raw water and the permeate water passing through the filtration module 300 is a direction toward the separate permeate water storage tank and the valves are open toward the corresponding direction.

At the backwash time set in the system, first, some of the permeate water is fed to the backwash module 400 through the transfer tube branched from the transfer tube, connected to the permeate water storage tank. In this case, a first valve 510 and a third valve 550 are in a closed state and a second valve 530 and a fourth valve 570 are in an open state. The fourth valve 570 is open toward the backwash module 400. Next, some of the raw water is fed from the backwash module 400 through the transfer tube branched from the back end of the raw water pump 200 and the first valve 510 and the third valve 550 are in the open state and the second valve 530 and the fourth valve 570 are in the closed state.

The flux of raw water fed to the first valve 510 is detected by the flow meter 512. The first valve 510 adjusts a flux depending on the detected result and thus the raw water is fed to the backwash module 400. For this purpose, the first valve 510 is preferably provided as the flow control valve. The backwash flux may be preset upon the design of the system. As the backwash water, the permeate water in the backwash module 400 is fed to the filtration module 300 by the feed pressure of the raw water. A front end of the third valve 500 for discharging the backwash water to the filtration module 300 may also be provided with the flow meter, if necessary. The operation of the filtration module 300 stops when the backwash is performed, and the valves for feeding the raw water are closed and only the valves for feeding the backwash water are open. The washing water including the foreign materials after the backwash is discharged to the separate dirty water tank 600. After the backwash is completed, all the valves for feeding the backwash water are closed and the valves for feeding the raw water for purification are open.

After the backwash, the backwash module 400 is again filled with the permeate water. For this purpose, the first valve 510 and the third valve 550 are closed and the second valve 530 and the fourth valve 570 are open.

As described above, various types of backwash modules may be provided and the backwash water may be fed only by the feed pressure of the raw water without the separate backwash water feeding pump, thereby reducing the energy consumption.

According to the water purifying system and the backwash module control method thereof in accordance with the embodiment of the present invention, it is possible to save the capital expenditure (CAPEX) upon the construction of the backwash system by performing the backwash of the filter module using the pressure of the produced water for membrane filtration without the backwash pump. Further, it is possible to reduce the energy consumption by removing the backwash pump.

The various exemplary embodiments of the present invention, which is described as above and shown in the drawings, should not be interpreted as limiting the technical spirit of the present invention. The scope of the present invention is limited only by matters set forth in the claims and those skilled in the art can modify and change the technical subjects of the present invention in various forms. Therefore, as long as these improvements and changes are apparent to those skilled in the art, they are included in the protective scope of the present invention.

What is claimed is:

1. A water purifying system, comprising:
   a raw water tank configured to store raw water;
   a filter unit configured to include a plurality of filtration modules for purifying the raw water and a plurality of valves configured to feed or cut off the raw water;
   a raw water pump configured to feed the raw water from the raw water tank to the filter unit; and
   a backwash module configured to feed backwash water to the filter unit,
   wherein the raw water pump is configured to feed the raw water to the backwash module,
   the backwash module is configured to receive a portion of permeate water permeated by the filter unit, and to apply pressure to the portion of permeate water with the raw water that is fed to the backwash module such that the backwash module feeds the portion of permeate water to the filter unit as the backwash water, and
   the backwash module is configured to apply pressure to the raw water, that is fed thereto, with the portion of the permeate water, that is fed thereto, such that the backwash module feeds the raw water back to the raw water tank.

2. The water purifying system of claim 1, wherein the backwash module is provided with a first inlet, a second inlet, a first outlet, and a second outlet.

3. The water purifying system of claim 2, wherein the first inlet is provided with a first valve configured to control a flux of the raw water, the second inlet is provided with a fourth valve configured to feed the permeate water, the first outlet is provided with a second valve configured to discharge the raw water to the raw water tank, and the second outlet is provided with a third valve configured to discharge the backwash water.

4. The water purifying system of claim 3, wherein the backwash module is a pressure vessel or a pressure tank.

5. The water purifying system of claim 4, wherein an inside of the pressure vessel is provided with a piston moving along a length direction, the piston moves to the first valve when the permeate water is fed to discharge the raw water to an outside of the pressure vessel and moves to the third valve when the raw water is fed to discharge the backwash water to the outside of the pressure vessel.

6. The water purifying system of claim 4, wherein an inside of the pressure tank is provided with a diaphragm, the diaphragm moves to the first valve when the permeate water is fed to discharge the raw water to the outside of the pressure vessel and moves to the third valve when the raw water is fed to discharge the backwash water to the outside of the pressure vessel.

7. The water purifying system of claim 6, wherein the pressure tank further includes a pair of plates provided with a plurality of through holes, and each plate of the pair of plates is installed at a respective position of the pressure tank such that movement of the diaphragm is limited by the pair of plates.

8. The water purifying system of claim 4, wherein the inside of the pressure tank includes a balloon-like diaphragm, the diaphragm is pressurized when the raw water is fed to discharge the backwash water therein to the outside of the pressure tank and inflated when the permeate water is fed to discharge the raw water at the outside thereof to the outside of the pressure tank.

9. The water purifying system of claim 3, further comprising:
   a dirty water tank configured to discharge the backwash water after the backwash of the filtration module.

10. The water purifying system of claim 9, wherein the fourth valve is configured to increase an amount of permeate water supplied to the filtration module as a required amount of the backwash water increases.

11. The water purifying system of claim 9, wherein the raw water pump is configured to, when the permeate water permeated by the filtration module is fed to a reverse osmosis system, increase the flux of the raw water as the required amount of the backwash water increases.

12. The water purifying system of claim 3, further comprising:
    a flow meter configured to be installed at a front end of the first valve to detect the flux of the raw water.

13. The water purifying system of claim 12, wherein the first valve is a flow control valve and the second to fourth valves are an on/off valve.

14. The water purifying system of claim 13, wherein when the backwash module is fed with the permeate water, the first and third valves are closed and the second and fourth valves are open, when the backwash is performed, the first and third valves are open and the second and fourth valves are closed.

15. The water purifying system of claim 14, wherein the first valve is configured to control the flux of the raw water depending on a preset backwash flux.

16. A backwash module control method of the water purifying system having the configuration of claim 3, wherein the first valve, the second valve, the third valve, and the fourth valve are differently controlled depending on when the permeate water is fed to the backwash module, when the backwash is performed, and when the permeate water is re-fed to the backwash module.

17. The backwash module control method of claim 16, wherein when the permeate water is fed and re-fed to the backwash module, the first and third valves are closed and the second and fourth valves are open.

18. The backwash module control method of claim 16, wherein when the backwash is performed, the first and third valves are open and the second and fourth valves are closed.

19. The backwash module control method of claim 17, wherein the first valve controls the flux of the raw water depending on a detection result of a flow meter installed at a front end of the first valve to detect the flux of the raw water.

20. The backwash module control method of claim 19, wherein the first valve controls the flux of the raw water depending on a preset backwash flux.

* * * * *